March 10, 1959  W. R. DITTMAYER  2,876,519
FASTENER
Filed Sept. 25, 1956

Inventor:
Wolfram R. Dittmayer
By Ernest Montague
Attorney

United States Patent Office 2,876,519
Patented Mar. 10, 1959

2,876,519

FASTENER

Wolfram R. Dittmayer, Tutzing, Germany

Application September 25, 1956, Serial No. 612,034

Claims priority, application Germany September 27, 1955

2 Claims. (Cl. 24—205.13)

The present invention relates to a fastener.

Fasteners are known in which the closing members, consisting of artificial material, in the coupling strips are produced by rung-like stamping out of portions within the strips of artificial material and by bending over the latter to form a U-shape after said stamping step. The remaining strips have nose-like enlargements. These nose-like enlargements overlap each other upon joining the two U-shaped strips by means of a slide. Such fastener is thus maintained in closed position by means of the nose-like enlargements, which enter the recesses in the oppositely disposed strip. Yet, such fasteners can be manufactured only of a certain predetermined size. First of all, very fine chains having small members cannot be produced in this manner. A relatively thin strip of material is required for such fine chains. The nose-like enlargements do not provide sufficient holding power below a certain material thickness and below a certain size of its members.

It has been further proposed to provide the stampings obliquely to the longitudinal direction of the coupling strips, whereby the stampings have straight lines and stays are created between each pair of adjacent stampings which are of a shape identical with that of the stampings. Fasteners produced in this manner do not show great resistance against lateral pulling forces.

It is, therefore, one object of the present invention to provide a fastener which has an extremely great resistance against lateral pulling forces and sufficient resistance against breaking open the fastener.

It is another object of the present invention to provide a fastener having two strips in which each strip has a plurality of S-shaped stampings and the stays remaining betweeen each pair of adjacent S-shaped stampings are of a width greater than that of the stampings. Due to the S-shape of the stays in connection with the greater width of the remaining stays, a better connection of the coupling strips is experienced along the entire cutting line upon joining the coupling strips by means of a slide. In this manner the fasteners may be produced of comparatively weak material and their members may be of a small size.

It is yet another object of the present invention to provide a fastener in which the resistance against breaking open is still further increased by providing a plurality of S-shaped stampings and in which the center portion of each of the stays remaining between each pair of adjacent stampings is additionally widened.

With these and other objects in view which will become apparent in the following detailed description, the present invention will be clearly understood in connection with the accompanying drawing, in which.

Figure 3:
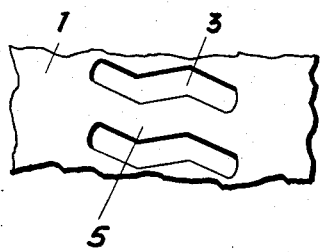
Fig. 3 is a fragmentary view of a strip indicating the stampings therein.
Figure 4:
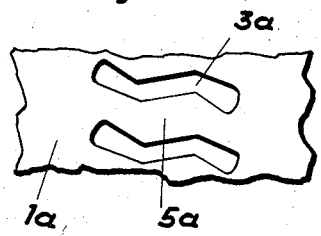
Fig. 4 is a fragmentary view of a second embodiment of a strip indicating the additionally widened center portion of the stays between the stampings.

Referring now to the drawing, the strips 1 and 2 are preferably of thermoplastic artificial material and each of the strips is produced in the same manner. The strips 1 receive S-shaped stampings which are disposed obliquely to the longitudinal direction of the strip. A stay 5 remains between each pair of adjacent stampings, which stay 5 is of a width larger for a part of a millimeter than the width of the stampings (Fig. 3). In accordance with a second embodiment, the arrangement may be made in such manner, that the stays 5a are additionally widened in their center portion (Fig. 4). The strips 1 and 2 thus provided with S-shaped stampings are bent to U-shape (Fig. 2), thereby forming a plurality of member-heads 6 and 7. The latter are fed into each other by the movement of a slide and secure together the two strips of the zipper. The joint of the opposite member-heads is assured by the fact that the respective member-heads 6 and 7 assume an angular position relative each other in the closed position of the fastener.

Figure 1:
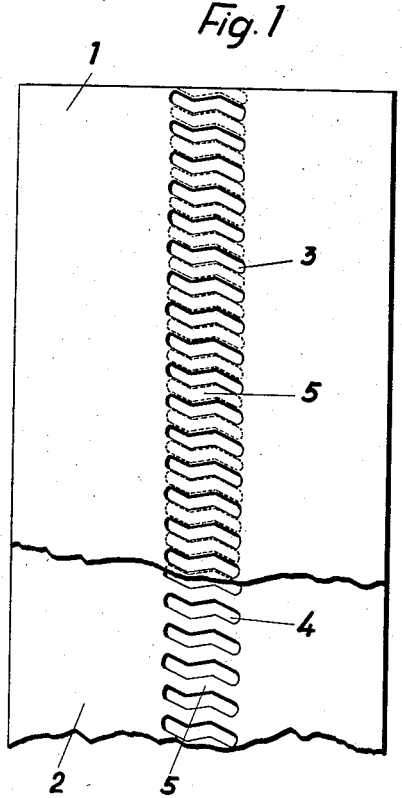
Figure 1 is a top plan view of two coupling strips in superposed position.
Figure 2:
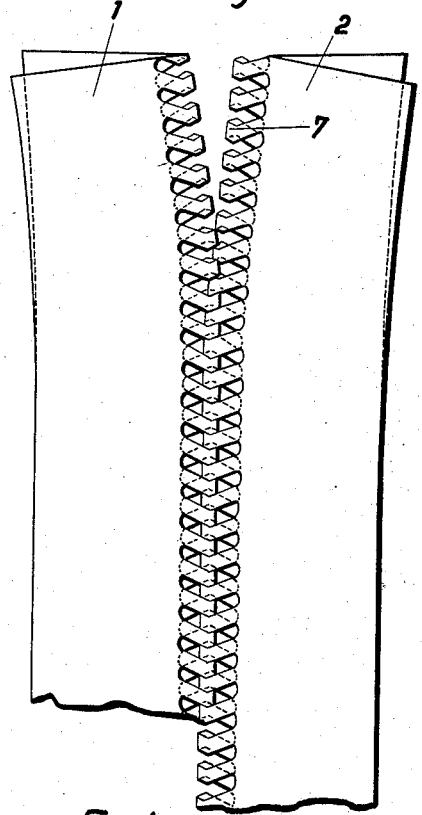
Fig. 2 is a top plan view of a fastener in partly open and partly closed position, the slide being not shown for better demonstration.

Figs. 1 and 2 demonstrate how the strips would appear in superposed position prior to their bending into U-shape. A stamping 3 of the strip 1 is disposed opposite a stay 5 of the strip 2 and vice versa. In this position the stays 5 cannot yet enter the stampings 3. Upon bending of both strips 1 and 2 into U-shape, however, the insertion of the stays 5 of one strip into corresponding stampings 3 of the other strip is made possible.

While I have disclosed a plurality of embodiments of the present invention, it is to be understood that these embodiments are given by example only and not in a limiting sense, the scope of the present invention being determined by the objects and the claims.

I claim:

1. A fastener comprising two strips, each of said strips being of artificial material and of U-cross section, and each of said strips having a plurality of stampings of S-shape when projected into a plane, and a stay between each pair of adjacent stampings, the width of said stays being greater than that of said stampings.

2. The fastener, as set forth in claim 1, in which the center portion of each of said stays is of a width greater than that of its end portions.

References Cited in the file of this patent

UNITED STATES PATENTS

| | | |
|---|---|---|
| 2,415,643 | Legat | Feb. 11, 1947 |
| 2,643,432 | English | June 30, 1953 |